US012798533B2

(12) United States Patent
Ham

(10) Patent No.: US 12,798,533 B2
(45) Date of Patent: Nov. 17, 2026

(54) PARKING ASSISTANCE SYSTEM AND METHOD

(71) Applicant: HL MANDO CORPORATION, Gyeonggi-do (KR)

(72) Inventor: Seunggeun Ham, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 83 days.

(21) Appl. No.: 18/810,508

(22) Filed: Aug. 21, 2024

(65) Prior Publication Data

US 2025/0282334 A1 Sep. 11, 2025

(30) Foreign Application Priority Data

Mar. 7, 2024 (KR) ........................ 10-2024-0032823

(51) Int. Cl.

*B60T 8/58* (2006.01)
*B60T 8/171* (2006.01)
*B60T 8/172* (2006.01)

(52) U.S. Cl.

CPC ................ *B60T 8/58* (2013.01); *B60T 8/171* (2013.01); *B60T 8/172* (2013.01); *B60T 2210/20* (2013.01); *B60T 2220/04* (2013.01); *B60T 2240/00* (2013.01); *B60T 2250/00* (2013.01)

(58) Field of Classification Search

CPC . B60T 8/58; B60T 8/171; B60T 8/172; B60T 2210/20; B60T 2220/04; B60T 2240/00; B60T 2250/00; B60T 8/86; B60T 7/12; B60T 8/17; B60T 2260/04; B60Y 2400/81

USPC ........................................................... 701/70

See application file for complete search history.

(56) References Cited

FOREIGN PATENT DOCUMENTS

| | | | |
|---|---|---|---|
| CN | 111231688 A * | 6/2020 | ................ B60L 7/18 |
| KR | 10-2012-0051223 | 5/2012 | |
| KR | 10-2013-0030632 | 3/2013 | |
| KR | 10-1714276 | 3/2017 | |

(Continued)

OTHER PUBLICATIONS

Office Action (1st) dated Jun. 20, 2025 for Korean Patent Application No. 10-2024-0032823 and its English translation provided by Applicant's foreign counsel.

*Primary Examiner* — Lindsay M Low
*Assistant Examiner* — Omar Morales
(74) *Attorney, Agent, or Firm* — WOMBLE BOND DICKINSON (US) LLP

(57) ABSTRACT

Disclosed herein is a parking assistance system including an electronic parking brake associated with at least one wheel of a vehicle, a parking brake drive circuit configured to control the electronic parking brake, and a processor configured to start braking control for maintaining a braking force applied by a main brake based on input information of a transmission gear and information of whether the vehicle is braking and stopping, wherein a duration of the braking control for maintaining the braking force applied by the main brake is shorter than or equal to a preset first time, and control the braking force applied by the main brake to be released based on whether the electronic parking brake is engaged or whether a target transmission gear is changed, and it is possible to minimize an impact caused by transmission by maintaining the braking force applied by the main brake for a predetermined time when performing parking gear transmission.

20 Claims, 6 Drawing Sheets

(56) References Cited

FOREIGN PATENT DOCUMENTS

| | | |
|---|---|---|
| KR | 10-2020-0127672 | 11/2020 |
| KR | 10-2021-0073692 | 6/2021 |
| KR | 10-2021-0119617 | 10/2021 |
| KR | 10-2023-0115933 | 8/2023 |

* cited by examiner

PARKING ASSISTANCE SYSTEM AND METHOD

CROSS-REFERENCE TO RELATED APPLICATION

This application claims the benefit of Korean Patent Application No. 10-2024-0032823, filed on Mar. 7, 2024 in the Korean Intellectual Property Office, the disclosure of which is incorporated herein by reference.

BACKGROUND

1. Field

Embodiments of the present disclosure relate to a parking assistance system and method, and more specifically, to a parking assistance system and method, which can prevent an impact caused by transmission performed during parking.

2. Description of the Related Art

Typically, in a process of shifting, by a driver, a gear of a transmission to a P stage (parking gear) to switch a vehicle to enter a parking mode, the transmission has a function of visually displaying a target transmission gear position to the driver. Such display clearly conveys a current and anticipated state of the transmission to the driver. Then, it takes about 0.5 to 2 seconds to actually end the transmission to the P stage.

When the driver stops the vehicle for parking during the transmission process, then shifts the gear to the P stage, and immediately step off a brake pedal during the above-described time period, an impact may occur on the vehicle. Such an impact mainly occurs at the moment when the transmission to the P stage is completed, and the movement of the vehicle may be changed depending on an inclined road of a road surface and a time when the driver steps off the brake pedal. In particular, when the road surface is inclined, the vehicle may move slightly when the driver steps off the brake pedal, thereby causing the driver to more greatly feel an impact at the time of P stage engagement.

SUMMARY

Therefore, it is an aspect of the present disclosure to provide a parking assistance system and method, which are capable of automatically maintaining a braking force of a vehicle during a time between a P stage input for a transmission and the actual completion of the P stage for the transmission to prevent an impact caused by transmission occurring during parking.

Additional aspects of the disclosure will be set forth in part in the description which follows and, in part, will be obvious from the description, or may be learned by practice of the disclosure.

In accordance with one aspect of the present disclosure, a parking assistance system may include an electronic parking brake associated with at least one wheel of a vehicle, a parking brake drive circuit configured to control the electronic parking brake, and a processor configured to start braking control for maintaining a braking force applied by a main brake based on input information of a transmission gear and information of whether the vehicle is braking and stopping, wherein a duration of the braking control for maintaining the braking force applied by the main brake is shorter than or equal to a preset first time, and the processor may control the braking force applied by the main brake to be released based on whether the electronic parking brake is engaged or whether a target transmission gear is changed.

The processor may be configured to control the braking force applied by the main brake to be released when engagement of the electronic parking brake is completed.

The processor may be configured to identify whether the target transmission gear is changed to a P stage when engagement of the electronic parking brake is not completed, and control the braking force applied by the main brake to be released when the target transmission gear is not changed to the P stage and the duration of the braking control for maintaining the braking force applied by the main brake exceeds a preset second time.

The processor may be configured to control the braking force applied by the main brake to be released when the target transmission gear is not changed to the P stage, the duration of the braking control for maintaining the braking force applied by the main brake does not exceed the preset second time, and engagement of the electronic parking brake is completed.

The processor may be configured to identify whether transmission to the P stage of the transmission gear is completed when the target transmission gear is changed to the P stage, and control the braking force applied by the main brake to be released when the transmission to the P stage of the transmission gear is completed.

The processor may be configured to identify whether transmission to the P stage of the transmission gear is completed when the target transmission gear is changed to the P stage, and control the braking force applied by the main brake to be released when the transmission to the P stage of the transmission gear is not completed and the duration of the braking control for maintaining the braking force applied by the main brake exceeds the preset first time.

The processor may be configured to, when the input information of the transmission gear corresponds to a P stage, determine whether the vehicle is braking and stopping based on a signal associated with displacement of a brake pedal or a signal associated with an wheel speed.

The processor may be configured to identify whether the vehicle is on an inclined road based on a signal associated with a longitudinal acceleration.

The processor may be configured to, when it is identified that the vehicle is on the inclined road, adjust the braking force applied by the main brake based on an inclination angle of a road surface on which the vehicle is.

The preset first time may be longer than the preset second time.

In accordance with another aspect of the present disclosure, a parking assistance method may include identifying whether a driver inputs a P stage based on input information of a transmission gear, identifying whether a vehicle is braking and stopping, controlling a braking force applied by a main brake to be maintained, wherein a duration of the braking control for maintaining the braking force applied by the main brake is shorter than or equal to a preset first time and controlling the braking force applied by the main brake to be released based on whether an electronic parking brake associated with at least one wheel of the vehicle is engaged or whether a target transmission gear is changed.

The controlling of the braking force applied by the main brake to be released may include controlling the braking force applied by the main brake to be released when engagement of the electronic parking brake is completed.

The parking assistance method may further include, after the identifying of whether the driver inputs the P stage, when engagement of the electronic parking brake is not completed, identifying whether the target transmission gear is changed to the P stage, identifying whether the target transmission gear is not changed to the P stage and a preset second time is exceeded, and controlling the braking force applied by the main brake to be released when the target transmission gear is not changed to the P stage and the duration of the braking control for maintaining the braking force applied by the main brake exceeds the preset second time.

The parking assistance method may further include controlling the braking force applied by the main brake to be released when the target transmission gear is not changed to the P stage, the duration of the braking control for maintaining the braking force applied by the main brake does not exceed the preset second time, and engagement of the electronic parking brake is completed.

The parking assistance method may further include identifying whether transmission to the P stage of the transmission gear is completed when the target transmission gear is changed to the P stage, and controlling the braking force applied by the main brake to be released when the transmission to the P stage of the transmission gear is completed.

The method may further include controlling the braking force applied by the main brake to be released when the transmission to the P stage of the transmission gear is not completed and the duration of the braking control for maintaining the braking force applied by the main brake exceeds the preset first time.

The identifying of whether the vehicle is braking and stopping may include identifying whether the vehicle is braking and stopping based on a signal associated with displacement of a brake pedal or a signal associated with a wheel speed.

The method may further include identifying whether the vehicle is on an inclined road based on a signal associated with a longitudinal acceleration.

The method may further include, when the vehicle is on an inclined road, adjusting the braking force applied by the main brake based on an inclination angle of a road surface on which the vehicle is.

The preset first time may be longer than the preset second time.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The same reference numbers indicate the same components throughout the specification. The present specification does not describe all elements of embodiments, and general contents or overlapping contents between the embodiments in the technical field to which the disclosure pertains will be omitted. Terms "unit," "module," "member," and "block" used in the specification may be implemented as software or hardware, and according to the embodiments, a plurality of "units," "modules," "members," and "blocks" may be implemented as one component, or one "unit," "module," "member," and "block" may also include a plurality of components.

Throughout the specification, when a first portion is described as being "connected" to a second portion, this includes both a case in which the first portion is directly connected to the second portion and a case in which the first portion is indirectly connected to the second portion, and the indirect connection includes connection through a wireless communication network.

In addition, when a certain portion is described as "including" a certain component, this means further including other components rather than precluding other components unless especially stated otherwise.

Throughout the specification, when a first member is described as being positioned "on" a second member, this includes both a case in which the first member is in contact with the second member and a case in which other members are present between the two members.

Terms such as first and second are used to distinguish one component from another, and the components are not limited by the above-described terms.

A singular expression includes plural expressions unless the context clearly dictates otherwise.

In each operation, identification symbols are used for convenience of description, and the identification symbols do not describe the sequence of each operation, and each operation may be performed in a different sequence from the specified sequence unless a specific sequence is clearly described in context.

Hereinafter, an operation principle and embodiments of the present disclosure will be described with reference to the accompanying drawings.

Figure 1:
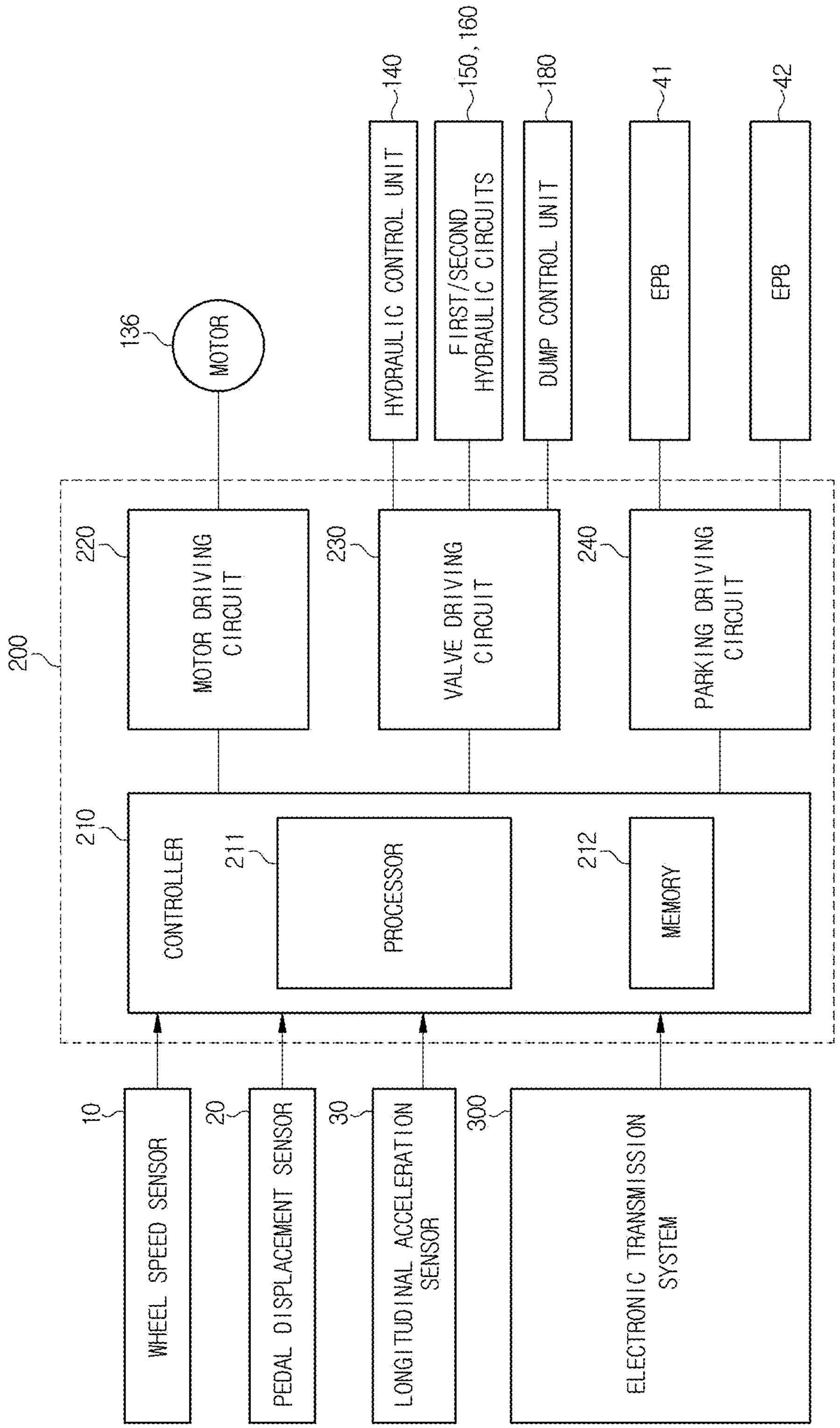
FIG. 1 shows a parking assistance system included in a vehicle according to one embodiment.
Figure 2:
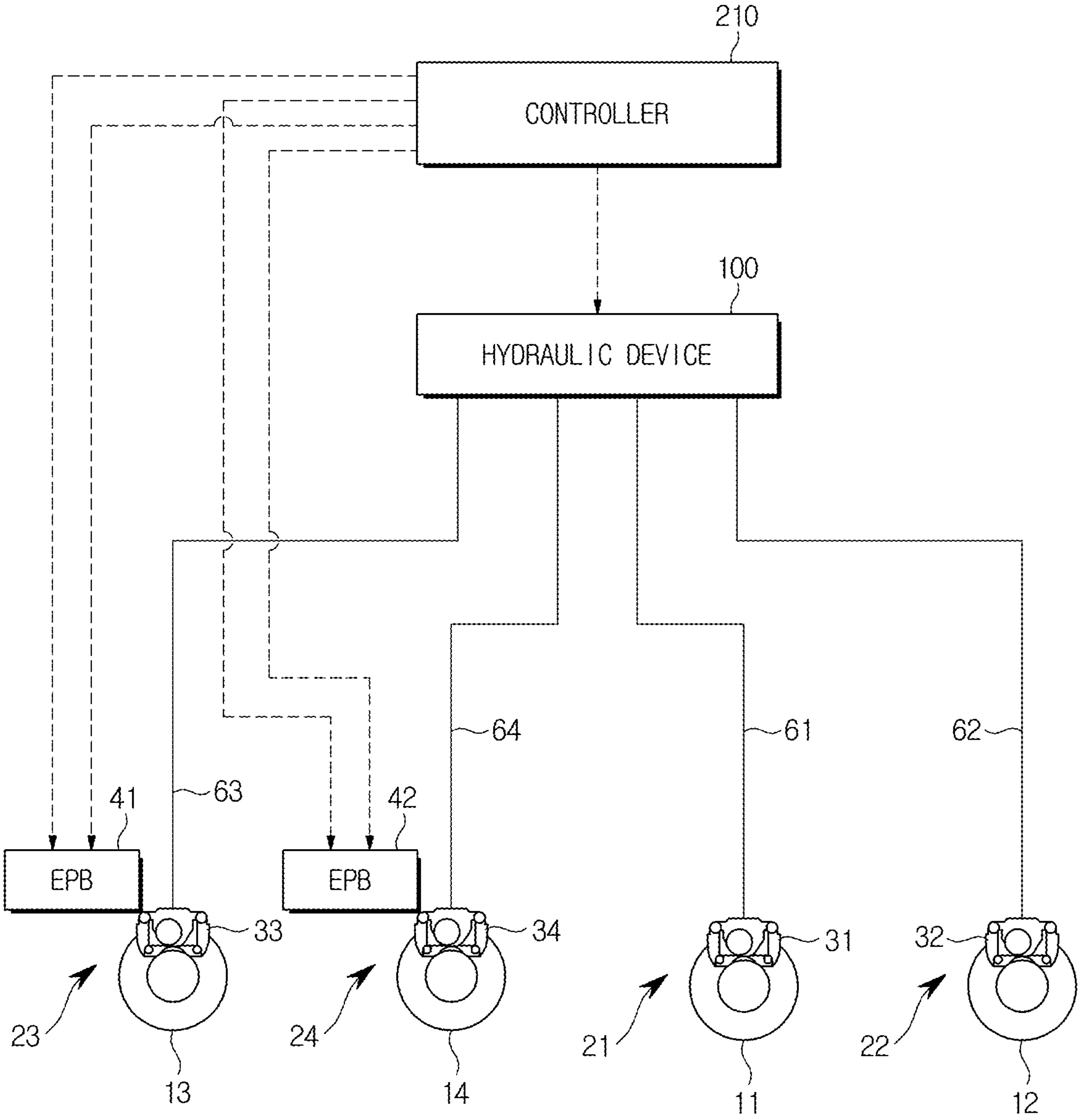
FIG. 2 shows hydraulic and electrical control of a main brake and an electronic parking brake according to one embodiment.
Figure 3:
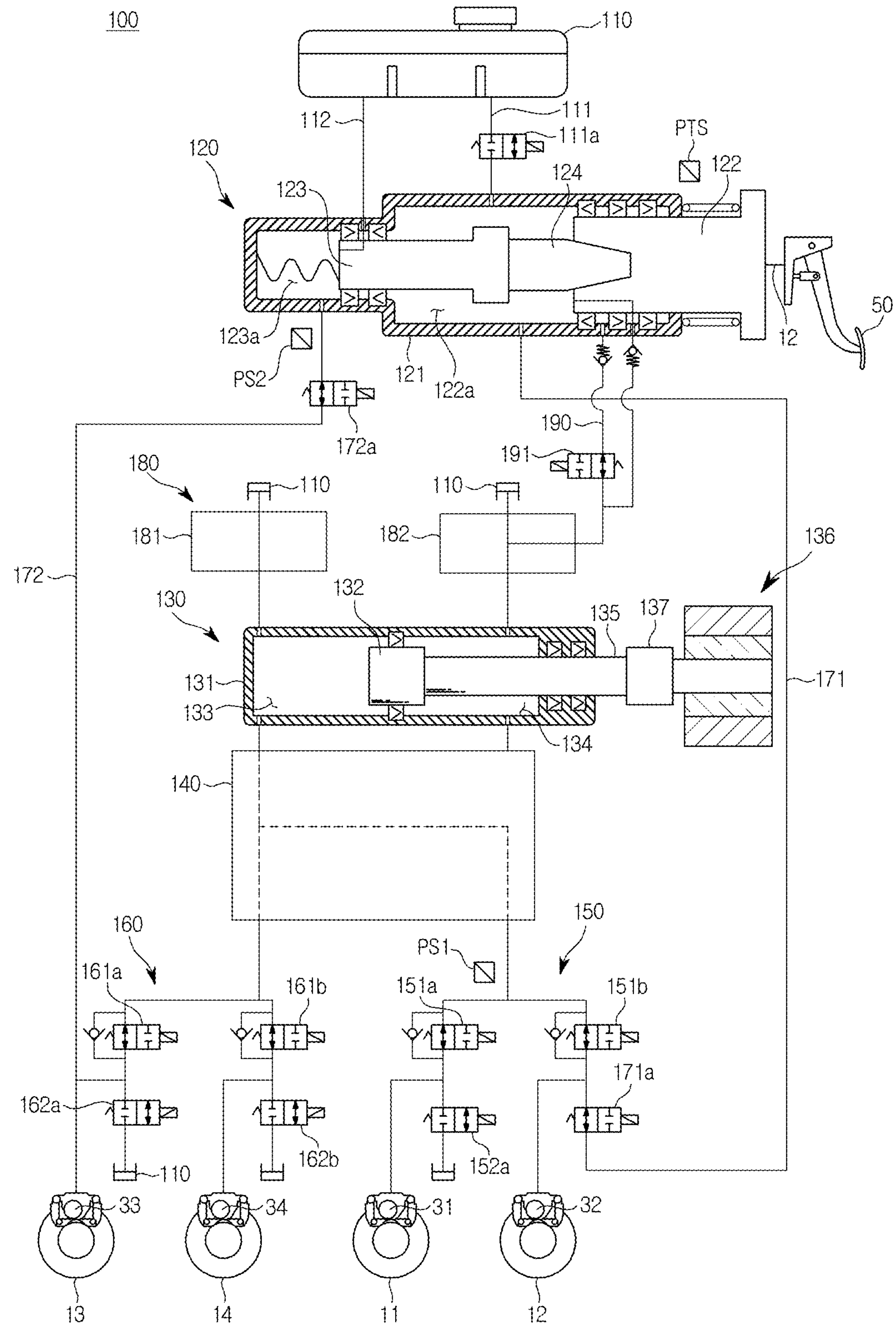
FIG. 3 shows one example of a hydraulic structure of a hydraulic device controlled by the parking assistance system according to one embodiment.
Figure 4:
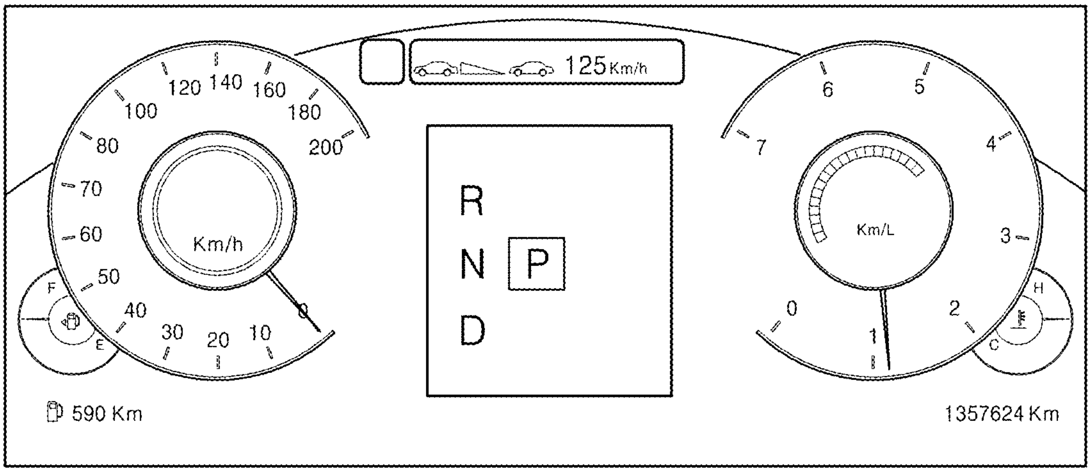
FIG. 4 shows a transmission interface of the vehicle to which the parking assistance system according to one embodiment is applied.

FIG. 1 shows a parking assistance system included in a vehicle according to one embodiment. FIG. 2 shows hydraulic and electrical control of a main brake and an electronic parking brake according to one embodiment. FIG. 3 shows one example of a hydraulic structure of a hydraulic device controlled by the parking assistance system according to one embodiment. FIG. 4 shows a transmission interface I of the vehicle to which the parking assistance system according to one embodiment is applied.

As used herein, the term 'main brake' refers to the primary braking system of the vehicle, also known as the service brake. The main brake is typically operated by the brake pedal and is used for slowing or stopping the vehicle during normal driving conditions. This is in contrast to the electronic parking brake, which is a separate system primarily used to keep the vehicle stationary when parked.

As shown in FIGS. 1 to 3, an electronic control unit 200 may include a controller 210 including a processor 211 and a memory 212, a motor driving circuit 220 for applying a driving current to a motor 136, a valve driving circuit 230 for applying a driving current for control of a hydraulic control unit 140, first and second hydraulic circuits 150 and 160, and a dump control unit 180, a parking brake drive circuit 240 for applying a driving current for control a parking operation of electronic parking brakes 41 and 42, and the controller

210 for controlling operations of the motor driving circuit 220, the valve driving circuit 230, and the parking brake drive circuit 240.

More specifically, the processor 211 of the controller 210 may control the main braking brake operated by the motor 136, various units connected to the valve driving circuit 230, and the electronic parking brakes 41 and 42 based on various signals received from a wheel speed sensor 10, a pedal displacement sensor 20, a longitudinal acceleration sensor 30 and pieces of transmission-related information such as input information of a transmission gear.

Components of the motor driving circuit 220, the valve driving circuit 230, the parking brake drive circuit 240, the motor 136, the hydraulic control unit 140, the first and second hydraulic circuits 150 and 160, the dump control unit 180, the electronic parking brakes 41 and 42, and the pedal displacement sensor 20 do not correspond to essential components of the electronic control unit 200, and at least some components may be omitted.

The motor 136 may include a rotational shaft provided rotatably. The motor 136 may include a rotor connected to the rotational shaft and a stator fixed to a housing. For example, the rotor may include a permanent magnet in which an N pole and an S pole are alternately disposed along an outer surface thereof, and the stator may include a plurality of teeth disposed along the outer surface of the rotor and a plurality of coils surrounding each of the plurality of teeth.

The rotor may be rotated by magnetic interaction with the stator, and the rotation of the rotor may be provided to the rotational shaft. The motor 136 may receive a driving current controlled by the motor driving circuit 220. The plurality of coils included in the stator may form magnetic fields that are rotated near the rotor by the driving current, and the rotor may be rotated by magnetic interaction between a magnetic field of the rotor and a magnetic field of the stator.

The hydraulic control unit 140, the first and second hydraulic circuits 150 and 160, and the dump control unit 180 may control flow paths extending from a master cylinder 120 or a hydraulic pressure supply unit 130 to wheel cylinders 31, 32, 33, and 34.

The hydraulic control unit 140, the first and second hydraulic circuits 150 and 160, and the dump control unit 180 may receive a driving current controlled by the valve driving circuit 230. The hydraulic control unit 140, the first and second hydraulic circuits 150 and 160, and the dump control unit 180 may each include at least one solenoid valve that is opened or closed by the driving current. The solenoid valve may include a plunger for opening or closing the flow path, a spring for applying an elastic force to the plunger, and a coil surrounding the plunger. The coil may generate a magnetic field by the driving current, and the plunger may move against the elastic force of the spring by the magnetic field of the coil. Therefore, the solenoid valve may be opened or closed.

The first and second parking brakes 41 and 42 may each be provided with a device capable of moving a brake pad by an electro-mechanical force without a hydraulic pressure. For example, the first and second parking brakes 41 and 42 may each include a motor having a rotational shaft and a spindle reciprocated by the rotation of the rotational shaft. The spindle may reciprocate the brake pad by the rotation of the rotational shaft.

The motor included in each of the first and second parking brakes 41 and 42 may receive a driving current controlled by the parking brake drive circuit 240. The motor included in each of the first and second parking brakes 41 and 42 may press the brake pad toward a brake disk or separate the brake pad from the brake disk by the driving current.

The pedal displacement sensor 20 may be installed near the brake pedal 50 and may measure the movement of a brake pedal 50 by a driver's braking intention. For example, the pedal displacement sensor 20 may detect a moving distance and/or moving speed from a reference position of the brake pedal 50.

The pedal displacement sensor 20 may be electrically connected to the processor 211 and may provide an electrical signal (pedal displacement signal) corresponding to the moving distance and/or moving speed of the brake pedal 50 to the processor 211. For example, the pedal displacement sensor 20 may be directly connected to the processor 211 via a hard wire or connected to the processor 211 via a communication network.

The motor driving circuit 220 may control the driving current supplied to the motor 136 according to a motor control signal of the processor 211. For example, the motor driving circuit 220 may include a three-phase inverter including a plurality of switching elements for controlling the driving current supplied to the motor 136 and an inverter driver for controlling the switching elements included in the three-phase inverter according to the motor control signal of the processor 211. The inverter driver may provide a motor driving signal for driving the three-phase inverter to the switching elements of the three-phase inverter according to the motor control signal of the processor 211. The three-phase inverter may convert DC power supplied from a battery of the vehicle into AC power according to the motor driving signal of the inverter driver and provide the converted AC power to the motor 136.

The valve driving circuit 230 may control the driving current supplied to the valves included in the hydraulic control unit 140, the first and second hydraulic circuits 150 and 160, and the dump control unit 180 according to a valve control signal of the processor 211. For example, the valve driving circuit 230 may include switching elements for controlling the driving current supplied to the valves and switching drivers for controlling the switching elements according to the valve control signal of the processor 211.

The parking brake drive circuit 240 may control the driving current supplied to the motors included in the electronic parking brakes 41 and 42 according to parking control signals (parking engagement signal and parking disengagement signal) of the processor 211. That is, the parking brake drive circuit 240 may control the operations of the electronic parking brakes 41 and 42 associated with at least one wheel of the vehicle based on the parking control signal of the processor 211. For example, the parking brake drive circuit 240 may include an H-bridge circuit including a plurality of switching elements for controlling the driving current supplied to the electronic parking brake motors and an H-bridge driver for controlling the switching elements included in the H-bridge circuit according to the parking control signals of the processor 211.

The controller 210 may include the processor 211 for controlling the components included in the electronic control unit 200 and the memory 212 for storing or recording programs and data for implementing operations of controlling the components included in the electronic control unit 200.

The memory 212 may provide the stored programs and data to the processor 211 and store temporary data generated during operation of the processor 211. For example, the memory 212 may include, for example, volatile memories such as a static random access memory (SRAM) and a dynamic RAM (DRAM) and non-volatile memories such as a read only memory (ROM), an erasable programmable ROM (EPROM), and a flash memory.

The processor 211 may be electrically connected to the wheel speed sensor 10, the pedal displacement sensor 20, the longitudinal acceleration sensor 30, an electronic transmission system 300, the motor driving circuit 220, the valve driving circuit 230, and the parking brake drive circuit 240.

The processor 211 may receive input information of the transmission gear from the electronic transmission system 300 and receive electrical signals from the wheel speed sensor 10 and the pedal displacement sensor 20.

The processor 211 may process the electrical signals and transmission-related information received from the wheel speed sensor 10, the pedal displacement sensor 20, the longitudinal acceleration sensor 30 and provide the motor control signal, the valve control signal, and the parking control signal to the motor driving circuit 220, the valve driving circuit 230, and the parking brake drive circuit 240, respectively, based on the result of processing the electrical signals and the transmission-related information.

For example, the processor 211 may determine a braking control mode based on input information of the transmission gear and the presence or absence of braking and stop.

The braking control mode is a type of a control mode performed by the electronic control unit 200 when preset input conditions (P stage input, braking, and stop) according to the driver's parking intention are satisfied, and means a control mode in which a braking force applied to a main braking brake according to the fact that the driver steps on the brake pedal 50 is maintained for a preset time, for example, a preset first time or a preset second time regardless of whether the driver continuously steps on the brake pedal.

When the driver shifts a gear of the transmission to the P stage (parking gear) to switch the vehicle to enter a parking mode, it takes about 0.5 to 2 seconds for the transmission to actually end the transmission to the P stage. Therefore, when the driver stops the vehicle for parking, then shifts the gear to the P stage, or at the same time, releases the brake pedal 50, an impact may occur in the vehicle.

Therefore, the electronic control unit 200, more specifically, the processor 211 of the controller 210 according to the embodiment of the present disclosure may perform a braking control mode to prevent an impact caused by the release of the brake pedal 50 between the moment the driver presses a P stage input button and the actual transmission end time point to the P stage of the transmission.

For example, when it is determined that the current mode is the braking control mode, the processor 211 may control the braking force applied to the main braking brake to be maintained and control the braking force applied by the main brake to be released based on whether the electronic parking brakes 41 and 42 are engaged or whether the target transmission gear is changed.

As shown in FIG. 2, the electronic control unit 200 includes a hydraulic device 100 for generating a hydraulic pressure for braking the vehicle, and the controller 210 for controlling an operation of the hydraulic device 100.

The hydraulic device 100 may generate the hydraulic pressure for generating a braking force to wheels 11, 12, 13, and 14. The hydraulic device 100 may detect the driver's braking intention through, for example, the brake pedal 50. The hydraulic device 100 may generate the hydraulic pressure based on the moving distance and/or moving speed of the brake pedal 50 and provide the generated hydraulic pressure to the wheel cylinders 31, 32, 33, and 34 through transfer flow paths 61, 62, 63, and 64. The transfer flow paths 61, 62, 63, and 64 may include the first transfer flow path 61 connected to the first wheel cylinder 31, the second transfer flow path 62 connected to the second wheel cylinder 32, the third transfer flow path 63 connected to the third wheel cylinder 33, and the fourth transfer flow path 64 connected to the fourth wheel cylinder 34.

Internal pressures of the wheel cylinders 31, 32, 33, and 34 may depend on the hydraulic pressure provided from the hydraulic device 100. Depending on the internal pressures of the wheel cylinders 31, 32, 33, and 34, braking forces may be generated in the wheels 11, 12, 13, and 14.

As shown in FIG. 3, the hydraulic device 100 may include a reservoir 110 in which a pressing medium is stored, the master cylinder 120 for providing a driver with a reaction force according to a pressing force of the brake pedal 50 and at the same time, pressing and discharging the pressing medium such as a brake oil accommodated therein, the hydraulic pressure supply unit 130 for receiving the driver's braking intention as electrical signals from the pedal displacement sensor 20 for detecting displacement of the brake pedal 50 and generating a hydraulic pressure of the pressing medium through a mechanical operation, a hydraulic control unit 140 for controlling the hydraulic pressure provided from the hydraulic pressure supply unit 130, the hydraulic circuits 150 and 160 including the wheel cylinders 31, 32, 33, and 34 for receiving the hydraulic pressure of the pressing medium to perform braking of each of the wheels 11, 12, 13, and 14, back-up flow paths 171 and 172 hydraulically connecting the master cylinder 120 with the hydraulic circuits 150 and 160, the dump control unit 180 provided between the hydraulic pressure supply unit 130 and the reservoir 110 to control a flow of the pressing medium, and an inspection flow path 190 connected to a master chamber of the master cylinder 120.

The reservoir 110, the master cylinder 120, the hydraulic pressure supply unit 130, the hydraulic control unit 140, the hydraulic circuits 150 and 160, the backup flow paths 171 and 172, the dump control unit 180, the reservoir flow paths 111 and 112, and the inspection flow path 190 do not correspond to essential components of the hydraulic device 100, and at least some components may be omitted.

When the driver applies the pedal force to the brake pedal 50 for a braking operation, the master cylinder 120 may provide a stable pedal feel by providing the driver with the reaction force in response to the pedal force. In addition, the master cylinder 120 may be provided to press and discharge the pressing medium accommodated therein by the operation of the brake pedal 50.

The master cylinder 120 may include a cylinder body 121 forming a chamber therein, a first master chamber 122*a* formed at an inlet side of the cylinder body 121 to which the brake pedal 50 is connected, a first master piston 122 provided in the first master chamber 122*a* and connected to the brake pedal 50 to be provided to be displaced by the operation of the brake pedal 50, a second master chamber 123*a* formed inside and in front of (left side based on FIGS. 2 and 3) the first master chamber 122*a*, a second master piston 123 provided in the second master chamber 123*a* and provided to be displaced by the displacement of the first master piston 122 or the hydraulic pressure of the pressing medium accommodated in the first master chamber 122*a*, and a pedal simulator 124 disposed between the first master piston 122 and the second master piston 123 to provide a pedal feel through an elastic restoring force generated upon compression.

The cylinder body 121, the first master chamber 122*a*, the first master piston 122, the second master chamber 123*a*, the second master piston 123, and the pedal simulator 124 do not correspond to essential components, and at least some components may be omitted.

The first master piston 122 and the second master piston 123 are provided in the first master chamber 122*a* and the second master chamber 123*a*, respectively, to generate a hydraulic pressure or a negative pressure in the pressing medium accommodated in each chamber according to the forward movement and the backward movement.

The pedal simulator 124 may be provided between the first master piston 122 and the second master piston 123 and may provide the pedal feel of the brake pedal 50 to the driver by the elastic restoring force thereof.

The reservoir 110 may accommodate and store the pressing medium therein. The reservoir 110 may be connected to each component such as the master cylinder 120, the hydraulic pressure supply unit 130, and a hydraulic circuit to be described below to supply or receive the pressing medium.

Reservoir flow paths 111 and 112 hydraulically connecting the reservoir 110 and the master cylinder 120 may be provided between the reservoir 110 and the master cylinder 120. The reservoir flow paths 111 and 112 may include a first reservoir flow path 111 connecting the first master chamber 122*a* of the master cylinder 120 with the reservoir 110 and a second reservoir flow path 112 connecting the second master chamber 123*a* of the master cylinder 120 with the reservoir 110. A simulator valve 112*a* may be provided on the first reservoir flow path 111 so that a flow of the pressing medium between the reservoir 110 and the first master chamber 122*a* through the first reservoir flow path 111 may be controlled.

The hydraulic pressure supply unit 130 may be provided to receive the driver's braking intention as the electrical signals from the pedal displacement sensor 20 for detecting the displacement of the brake pedal 50 to generate the hydraulic pressure of the pressing medium through the mechanical operation.

The hydraulic pressure supply unit 130 may include a cylinder block 131 provided to accommodate the pressing medium, a hydraulic piston 132 accommodated in the cylinder block 131, pressure chambers 133 and 134 partitioned by the hydraulic piston 132 and the cylinder block 131, the motor 136 for generating a rotating force, a power conversion unit 137 for converting the rotating force into the translational movement of the hydraulic piston 132, and a driving shaft 135 for transmitting power to the hydraulic piston 132.

The cylinder block 131, the hydraulic piston 132, the pressure chambers 133 and 134, the motor 136, the power conversion unit 137, and the driving shaft 135 do not correspond to essential components of the hydraulic pressure supply unit 130, and at least some components may be omitted.

The pressure chambers 133 and 134 may include the first pressure chamber 133 positioned in front (left direction of the hydraulic piston 132 based on FIG. 3) of the hydraulic piston 132 and the second pressure chamber 134 positioned behind (right direction of the hydraulic piston 132 based on FIG. 3) the hydraulic piston 132. That is, the first pressure chamber 133 may be partitioned by the cylinder block 131 and a front surface of the hydraulic piston 132 and provided to have a volume changed depending on the movement of the hydraulic piston 132. In addition, the second pressure chamber 134 may be partitioned by the cylinder block 131 and a rear surface of the hydraulic piston 132 and provided to have a volume changed depending on the movement of the hydraulic piston 132.

When the displacement of the brake pedal 50 is detected by the pedal displacement sensor 20, the hydraulic piston 132 may generate the hydraulic pressure in the first pressure chamber 133 while moving forward in the cylinder block 131. Conversely, when the pedal force of the brake pedal 50 is released, the hydraulic piston 132 may generate the negative pressure in the first pressure chamber 133 while moving backward in the cylinder block 131. The generation of the hydraulic pressure and the negative pressure in the second pressure chamber 134 may be implemented by an operation in an opposite direction.

As described above, the hydraulic pressure supply unit 130 may generate the hydraulic pressure or the negative pressure in the first pressure chamber 133 and the second pressure chamber 134 by the motor 136.

The hydraulic pressure supply unit 130 may be hydraulically connected to the reservoir 110 by the dump control unit 180. The dump control unit 180 may include at least one flow path and at least one valve to control the flow of the pressing medium between the hydraulic pressure supply unit 130 and the reservoir 110.

The hydraulic control unit 140 may be provided to control the hydraulic pressure transferred to each of the wheel cylinders 31, 32, 33, and 34.

The hydraulic control unit 140 is branched into the first hydraulic circuit 150 for controlling the flows of the hydraulic pressures transferred to the first and second wheel cylinders 31 and 32 among the four wheel cylinders 31, 32, 33, and 34 and the second hydraulic circuit 160 for controlling the flows of the hydraulic pressures transferred to the third and fourth wheel cylinders 33 and 34 among the four wheel cylinders 31, 32, 33, and 34. The hydraulic control unit 140 may include at least one flow path and at least one valve to guide the hydraulic pressure transferred from the hydraulic pressure supply unit 130 to the four wheel cylinders 31, 32, 33, and 34 to the first hydraulic circuit 150 and the second hydraulic circuit 160.

The hydraulic control unit 140 may form the flow paths for providing the pressing medium to the first hydraulic circuit 150 and the second hydraulic circuit 160 using the pressure of the first pressure chamber 133 formed by the forward movement of the hydraulic piston 132. For example, as shown in FIG. 3, the hydraulic control unit 140 may form the flow paths connecting the first pressure chamber 133 with the first and second hydraulic circuits 150 and 160. The pressing medium in the first pressure chamber 133 may be provided to the first and second hydraulic circuits 150 and 160 through the hydraulic control unit 140.

The hydraulic control unit 140 may form the flow paths for returning the pressing medium from the first hydraulic circuit 150 and the second hydraulic circuit 160 using the negative pressure of the first pressure chamber 133 formed by the backward movement of the hydraulic piston 132. For example, as shown in FIG. 3, the hydraulic control unit 140 may form the flow paths connecting the first pressure chamber 133 with the first and second hydraulic circuits 150 and 160. The pressing media of the first and second hydraulic circuits 150 and 160 may be provided to the first pressure chamber 133 through the hydraulic control unit 140.

The hydraulic control unit 140 may form the flow paths for returning the pressing medium from the first hydraulic circuit 150 and the second hydraulic circuit 160 using the negative pressure of the second pressure chamber 134 formed by the forward movement of the hydraulic piston 132. For example, as shown in FIG. 3, the hydraulic control unit 140 may form the flow paths connecting the second pressure chamber 134 with the first and second hydraulic circuits 150 and 160. The pressing media of the first and second hydraulic circuits 150 and 160 may be provided to the second pressure chamber 134 through the hydraulic control unit 140.

The first hydraulic circuit 150 may adjust and control the hydraulic pressure applied to the first and second wheel cylinders 31 and 32, and the second hydraulic circuit 160 may adjust and control the hydraulic pressure applied to the third and fourth wheel cylinders 33 and 34.

The first and second hydraulic circuits 150 and 160 may each include two of first to fourth inlet valves 151*a*, 151*b*, 161*a*, and 161*b* to control the flow and hydraulic pressure of the pressing medium transferred to the first to fourth wheel cylinders 31, 32, 33, and 34. The first to fourth inlet valves 151*a*, 151*b*, 161*a*, and 161*b* may each be disposed at an upstream side of each of the first to fourth wheel cylinders 31, 32, 33, and 34 and provided as normal open type solenoid valves.

The second hydraulic circuit 160 may include first and second outlet valves 162*a* and 162*b* for controlling the flow of the pressing medium discharged from the third and fourth wheel cylinders 33 and 34 to improve performance when the braking of the third and fourth wheel cylinders 33 and 34 is released. The first and second outlet valves 162*a* and 162*b* may each be provided at a discharge side of each of the third and fourth wheel cylinders 33 and 34 and may control the flows of the pressurizing medium transferred from the third and fourth wheel cylinders 33 and 34 to the reservoir 110. The first and second outlet valves 162*a* and 162*b* may be provided as normally closed type solenoid valves.

The first hydraulic circuit 150 may include a third outlet valve 152*a* for controlling the flow of the pressing medium discharged from the first wheel cylinder 31 to improve performance when the braking of the first wheel cylinder 31 is released. The third outlet valve 152*a* may be provided at the discharge side of the first wheel cylinder 31 to control the flow of the pressing medium transferred from the first wheel cylinder 31 to the reservoir 110. The third outlet valve 152*a* may be provided as a normally closed type solenoid valve.

The second wheel cylinder 32 of the first hydraulic circuit 150 may be connected to the first backup flow path 171, and a first cut valve 171*a* may be provided on the first backup flow path 171 to control the flow of the pressing medium between the second wheel cylinder 32 and the master cylinder 120.

The first backup flow path 171 may be provided to connect the first master chamber 122*a* of the master cylinder 120 with the first hydraulic circuit 150, and the second backup flow path 172 may be provided to connect the second master chamber 123*a* of the master cylinder 120 with the second hydraulic circuit 160.

At least one first cut valve 171*a* for controlling the flow of the pressing medium in both directions may be provided on the first backup flow path 171, and a second cut valve 172*a* for controlling the flow of the pressing medium in both directions may be provided on the second backup flow path 172. The first cut valve 171*a* and the second cut valve 172*a* may be provided as normal open type solenoid valves.

When the first and second cut valves 171*a* and 172*a* are closed, the pressing medium of the master cylinder 120 can be prevented from being directly transferred to the wheel cylinders 31, 32, 33, and 34, and at the same time, the hydraulic pressure provided from the hydraulic pressure supply unit 130 can be prevented from leaking toward the master cylinder 120. In addition, when the first and second cut valves 171*a* and 172*a* are opened, the pressing medium pressed in the master cylinder 120 may be directly supplied toward the first and second hydraulic circuits 150 and 160 through the first and second backup flow paths 171 and 172 to implement braking.

The inspection flow path 190 may be provided to connect the master cylinder 120 with the dump control unit 180 and provided to inspection whether various components mounted on the master cylinder 120 and the simulator valve 112*a* leak.

The hydraulic device 100 may include a first pressure sensor PS1 for measuring the hydraulic pressure of the pressing medium provided by the hydraulic pressure supply unit 130 and a second pressure sensor PS2 for measuring the hydraulic pressure provided by the master cylinder 120. The first pressure sensor PS1 and the second pressure sensor PS2 may output electrical signals representing the measured pressures to the controller 210.

The controller 210, specifically, the processor 211 of the controller 210 may control the operation of the hydraulic device 100. For example, the controller 210 may control the hydraulic pressure supply unit 130 to generate the hydraulic pressure based on the output of the pedal displacement sensor 20.

For example, the processor 211 may determine a target hydraulic pressure to be provided to the wheel cylinders 31, 32, 33, and 34 based on the pedal displacement signal of the pedal displacement sensor 20 and provide the motor control signal to the motor driving circuit 220 to move the hydraulic piston 132 in response to the target pressure.

For example, the processor 211 may provide the motor control signal to the motor driving circuit 220 to move the hydraulic piston 123 forward and provide the valve control signal to the valve driving circuit 230 to form the flow paths extending from the first pressure chamber 133 to the wheel cylinders 31, 32, 33, and 34. In addition, the processor 211 may provide the motor control signal to the motor driving circuit 220 to move the hydraulic piston 123 backward and provide the valve control signal to the valve driving circuit 230 to form the flow paths extending from the second pressure chamber 134 to the wheel cylinders 31, 32, 33, and 34.

In this case, when the current mode is determined as the braking control mode based on input information of the transmission gear and the presence or absence of braking and stop, the processor 211 may control the hydraulic device 100 to maintain the braking force applied to the main braking brake.

In the electronic control unit 200 according to one embodiment, when it is determined that the current mode is the braking control mode, the processor 211 of the controller 210 starts the braking control mode.

When starting the braking control mode, the processor 211 controls the valve driving circuit 230 to allow the hydraulic control unit 140 to maintain the braking force applied to the main braking brake regardless of whether the brake pedal 50 is released.

After starting the braking control mode, the processor 211 determines whether to end the braking control mode based on two conditions.

One is whether the electronic parking brakes 41 and 42 have been engaged, and the other is whether the transmission gear is changed to the P stage for the preset first time. However, here, when the preset first time is exceeded even when the transmission gear is not changed to the P stage, the braking control may be released, that is, the braking control mode may be ended.

The processor 211 monitors whether the electronic parking brakes 41 and 42 have been engaged in real time while performing the braking control mode. The processor 211 may end the braking control mode when the electronic parking brakes 41 and 42 have been engaged regardless of other variables in a braking control mode state, such as the target transmission gear and whether the transmission gear is changed to the P stage. Here, when the braking control mode is ended, it means that the main braking brake is allowed to be operated according to whether the driver steps on the brake pedal 50 by performing hydraulic control to cancel the braking force applied to the main braking brake.

The reason why the braking control mode is ended as the electronic parking brakes 41 and 42 have been engaged is that the electronic parking brakes 41 and 42 are actually engaged (e.g., a state in which parking is ended), and thus there is no need to maintain the braking force applied to the main braking brake.

However, even when the processor 211 starts the braking control mode, the maximum time at which the braking control mode is maintained may be set not to exceed the preset first time.

Here, the first time may be 3 seconds.

When the electronic parking brakes 41 and 42 have not been engaged, the processor 211 may identify whether the target transmission gear is changed to the P stage. To this end, the processor 211 may receive input information of the transmission gear from the electronic transmission system 300 in real time.

When the driver inputs the gear stage to be shifted to the transmission interface I, the target transmission gear indicates a gear stage at the time when the electronic transmission system 300 actually recognizes the input of the gear stage input into the transmission interface I.

For example, when the driver inputs the P (parking) stage into the transmission interface I to stop or park the vehicle at a D (driving) stage, the electronic transmission system 300 actually recognizes the P stage as the target transmission gear.

When the target transmission gear is not changed to the P stage and the preset second time is exceeded, the processor 211 may control the braking force applied by the main brake to be released. A slight delay is caused by signal transmission until the gear stage input to the transmission interface I is actually recognized by the electronic transmission system 300. The preset second time may be set to 0.5 seconds in consideration of such a delay time.

The reason why whether the target transmission gear is changed to the P stage is checked as described above is that there is no need to continuously perform the braking control mode in a case where the input stage signal is not transmitted from the transmission interface I to the electronic transmission system 300 due to a failure of an in-vehicle communication interface such as controller area network (CAN) communication, or a case where the driver inputs the P stage into the transmission interface I and then immediately re-inputs another stage (D, N, or R).

When the target transmission gear is not changed to the P stage, the preset second time is not exceeded, and engagement of the electronic parking brakes 41 and 42 is completed, the processor 211 may control the braking force applied by the main brake to be released. That is, as described above, since the electronic parking brakes 41 and 42 are actually engaged (e.g., the state in which parking is ended) and there is no need to maintain the braking force applied to the main braking brake, the processor 211 may end the braking control mode.

When the target transmission gear is changed to the P stage, the processor 211 may identify whether the transmission to the P stage of the transmission gear is completed, and when the transmission to the P stage of the transmission gear is completed, control the braking force applied by the main brake to be released (end the braking control mode). The processor 211 identifies that the target transmission gear of the electronic transmission system 300 is changed to the P stage by checking that input information of the transmission gear received from the electronic transmission system 300 is changed to the P stage. Subsequently, when the processor 211 receives P stage transmission end information according to the end of the transmission of the P stage of the transmission gear from the electronic transmission system 300, the processor 211 identifies that the transmission of the P stage of the transmission gear is completed and controls the braking force applied by the main brake to be released (cancel the braking control mode).

Here, when the preset first time is exceeded in a state in which the processor 211 does not receive the P stage transmission end information from the electronic transmission system 300, the processor 211 controls the braking force applied by the main brake to be released (cancel the braking control mode). The reason why the braking control mode is ended when the preset first time is exceeded in the state in which the transmission to the P stage is not completed is as follows. It is because there may be no need to continuously perform the braking control mode due to various variables inside the vehicle. For example, the variable may include a case where the communication interface inside the vehicle, such as CAN communication, fails, a case where the driver inputs the P stage into the transmission interface I and then immediately re-inputs another gear stage (D, N, or R), etc. That is, in a situation where the braking control mode needs to be actually ended due to the occurrence of a certain variable, the conditions in which the braking control mode is ended may not be recognized. Therefore, to prevent the braking control mode from being maintained unnecessarily, the preset first time may be set to an additional braking control mode cancel condition.

Here, the preset first time may be 3 seconds.

The processor 211 may receive input information of the transmission gear from the transmission interface I or the electronic transmission system 300 shown in FIG. 4.

When input information of the transmission gear is the P stage, the processor 211 may determine whether the vehicle is braking and stopping based on a signal associated with displacement of the brake pedal 50 and/or a signal associated with a wheel speed.

The processor 211 may identify whether the vehicle is on an inclined road based on a signal associated with a longitudinal acceleration.

In this case, the processor 211 may identify whether the vehicle is on the inclined road based on the signal associated with the longitudinal acceleration received from the longitudinal acceleration sensor 30. However, the present disclosure is not limited thereto, and whether the vehicle is on the slop may be identified using another detection device.

When the vehicle is on the inclined road, the processor 211 may adjust the braking force applied by the main brake based on an inclination angle of a road surface.

For example, the processor 211 may control a braking force greater than the braking force applied by the main brake to be applied in proportion to the inclination angle as the inclination angle of the road surface increases, that is, as the inclined road becomes steeper.

Figure 5:
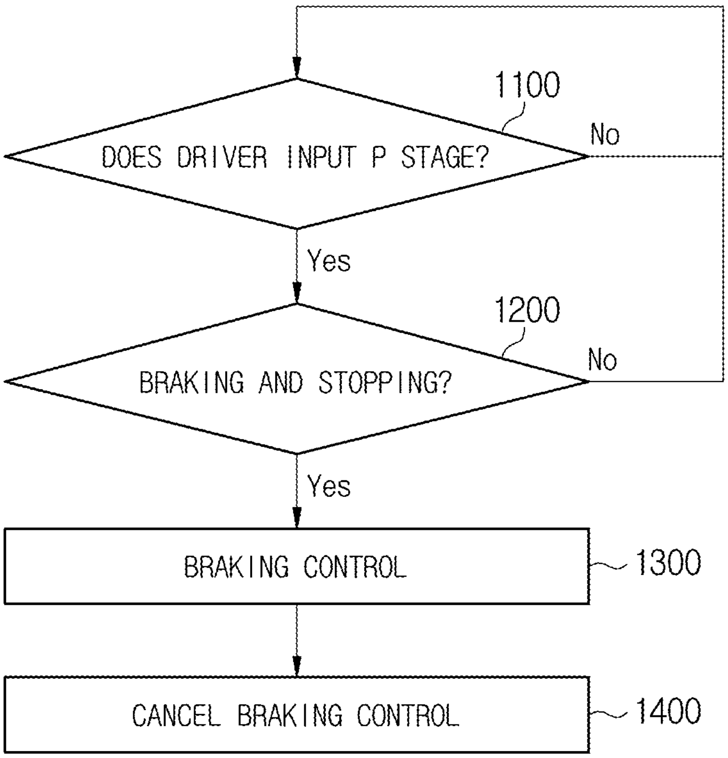
FIG. 5 is a flowchart showing a parking assistance method according to one embodiment.

FIG. 5 is a flowchart showing a parking assistance method according to one embodiment.

As shown in FIG. 5, the parking assistance method according to one embodiment of the present disclosure may include identifying whether the driver inputs the P stage based on input information of the transmission gear (1100), identifying whether the vehicle is braking and stopping (1200), controlling the braking force applied to the main braking brake to be maintained when the driver inputs the P stage and the vehicle is braking and stopping (1300), and controlling the braking force applied by the main brake to be released based on whether the electronic parking brakes 41 and 42 have been engaged or the target transmission gear is changed (1400).

In the identifying of whether the driver inputs the P stage (1100), when input information of the transmission gear is the P stage, the identifying of whether the vehicle is braking and stopping (1200) may include determining whether the vehicle is braking and stopping based on the signal associated with displacement of the brake pedal or the signal associated with a wheel speed.

Here, a duration of the braking control for maintaining the braking force applied by the main brake may be shorter than or equal to the preset first time.

Figure 6:
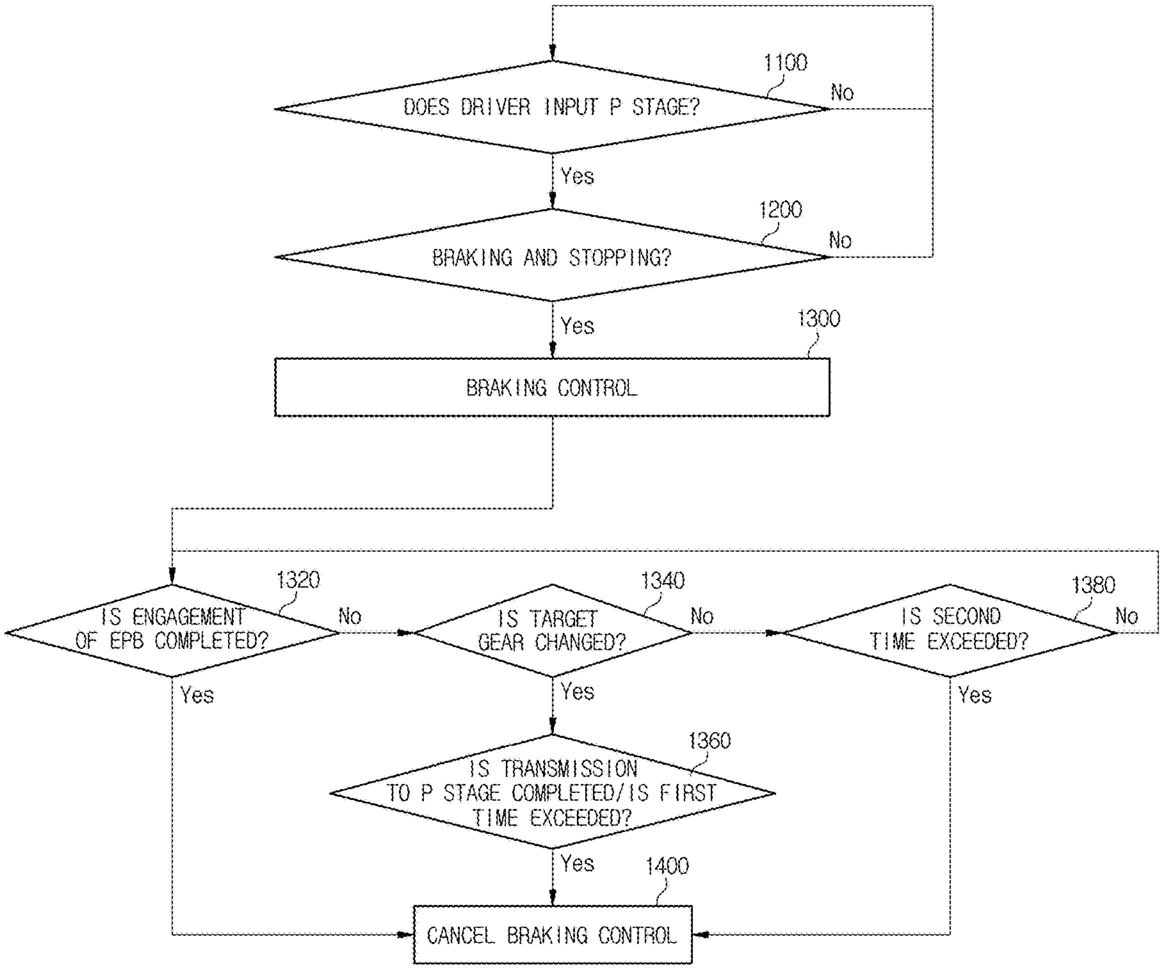
FIG. 6 is a flowchart more specifically showing the parking assistance method shown in FIG. 5.

FIG. 6 is a flowchart more specifically showing the parking assistance method shown in FIG. 5.

In the parking assistance method according to one embodiment of the present disclosure, specific additional operations between the controlling of the braking force applied to the main braking brake to be maintained (1300) and the controlling of the braking force applied by the main brake to be released (1400) are shown in FIG. 6.

In the controlling of the braking force applied to the main braking brake to be maintained (1300), whether the vehicle is on the inclined road may be determined based on the signal associated with the longitudinal acceleration.

When it is determined that the vehicle is on the inclined road, the braking force applied by the main brake may be adjusted based on the inclination angle of the road surface.

After the controlling of the braking force applied to the main braking brake to be maintained (1300), the method may further include identifying whether the electronic parking brakes 41 and 42 have been engaged. In this case, when engagement of the electronic parking brakes 41 and 42 is completed, the method may proceed to the controlling of the braking force applied by the main brake to be released (1400).

After the controlling of the braking force applied to the main braking brake to be maintained (1300), when engagement of the electronic parking brakes 41 and 42 is not completed, the method may further include identifying whether the target transmission gear is changed to the P stage (1340) and identifying whether the target transmission gear is not to the P stage and the preset second time is exceeded (1380).

In the identifying of whether the target transmission gear is not changed to the P stage and the preset second time is exceeded (1380), when the preset second time is exceeded, the method may proceed to the controlling of the braking force applied by the main brake to be released (1400).

In the identifying of whether the target transmission gear is not changed to the P stage and the preset second time is exceeded (1380), when the preset second time is not exceeded and engagement of the electronic parking brakes 41 and 42 is completed, the method may proceed to the controlling of the braking force applied by the main brake to be released (1400).

After the identifying whether the target transmission gear is changed to the P stage (1340), when the target transmission gear is changed to the P stage, the method may further include identifying whether the transmission to the P stage of the transmission gear is completed (1360).

In the identifying of whether the transmission to the P stage of the transmission gear is completed (1360), when the transmission to the P stage of the transmission gear is completed, the method may proceed to the controlling of the braking force applied by the main brake to be released (1400).

In the identifying of whether the transmission to the P stage of the transmission gear is completed (1360), when the transmission to the P stage of the transmission gear is not completed and the preset first time is exceeded, the method may proceed to the controlling of the braking force applied by the main brake to be released (1400).

As is apparent from the above description, it is possible to provide a parking assistance system and method, which can automatically maintain a braking force of a vehicle during the time between a P stage input for a transmission to the actual completion of the P stage for the transmission.

Therefore, according to the parking assistance system and method, it is possible to minimize the occurrence of the impact regardless of whether a driver steps on a brake pedal when switching the vehicle to enter a parking mode.

The above description is merely the exemplary description of the technical spirit of the present disclosure, and those skilled in the art to which the present disclosure pertains will be able to variously modify and change the present disclosure without departing from the essential characteristics of the present disclosure. Therefore, the embodiments disclosed in the present disclosure are not intended to limit the technical spirit of the present disclosure, but intended to describe the same, and the scope of the technical spirit of the present disclosure is not limited by these embodiments. The scope of the present disclosure should be construed by the appended claims, and all technical spirits within the equivalent range should be construed as being included in the scope of the present disclosure.

What is claimed is:

1. A parking assistance system comprising:
- an electronic parking brake associated with at least one wheel of a vehicle;
- a parking brake drive circuit configured to control the electronic parking brake; and
- a processor configured to:
- start braking control for maintaining a braking force applied by a main brake based on input information of a transmission gear and information of whether the vehicle is braking and stopping, wherein a duration of the braking control for maintaining the braking force applied by the main brake is shorter than or equal to a preset first time; and
- control the braking force applied by the main brake to be released when the duration of the braking control for maintaining the braking force applied by the main brake exceeds the preset first time.

2. The parking assistance system of claim 1, wherein the processor is configured to control the braking force applied by the main brake to be released when engagement of the electronic parking brake is completed.

3. The parking assistance system of claim 1, wherein the processor is configured to:

identify whether the target transmission gear is changed to a P stage when engagement of the electronic parking brake is not completed; and control the braking force applied by the main brake to be released when the target transmission gear is not changed to the P stage and the duration of the braking control for maintaining the braking force applied by the main brake exceeds a preset second time.

4. The parking assistance system of claim 3, wherein the processor is configured to control the braking force applied by the main brake to be released when the target transmission gear is not changed to the P stage, the duration of the braking control for maintaining the braking force applied by the main brake does not exceed the preset second time, and engagement of the electronic parking brake is completed.

5. The parking assistance system of claim 3, wherein the processor is configured to:

identify whether transmission to the P stage of the transmission gear is completed when the target transmission gear is changed to the P stage; and control the braking force applied by the main brake to be released when the transmission to the P stage of the transmission gear is completed.

6. The parking assistance system of claim 3, wherein the processor is configured to:

identify whether transmission to the P stage of the transmission gear is completed when the target transmission gear is changed to the P stage; and control the braking force applied by the main brake to be released when the transmission to the P stage of the transmission gear is not completed and the duration of the braking control for maintaining the braking force applied by the main brake exceeds the preset first time.

7. The parking assistance system of claim 3, wherein the preset first time is longer than the preset second time.

8. The parking assistance system of claim 1, wherein the processor is configured to, when the input information of the transmission gear corresponds to a P stage, determine whether the vehicle is braking and stopping based on a signal associated with displacement of a brake pedal or a signal associated with an wheel speed.

9. The parking assistance system of claim 1, wherein the processor is configured to identify whether the vehicle is on an inclined road based on a signal associated with a longitudinal acceleration.

10. The parking assistance system of claim 9, wherein the processor is configured to, when it is determined that the vehicle is on the inclined road, adjust the braking force applied by the main brake based on an inclination angle of a road surface on which the vehicle is.

11. A parking assistance method parking brake drive comprising:

identifying whether a driver inputs a P stage based on input information of a transmission gear;

identifying whether a vehicle is braking and stopping;

controlling a braking force applied by a main brake to be maintained, wherein a duration of the braking control for maintaining the braking force applied by the main brake is shorter than or equal to a preset first time; and controlling the braking force applied by the main brake to be released when the duration of the braking control for maintaining the braking force applied by the main brake exceeds the preset first time.

12. The parking assistance method of claim 11, wherein the controlling of the braking force applied by the main brake to be released comprises controlling the braking force applied by the main brake to be released when engagement of the electronic parking brake is completed.

13. The parking assistance method of claim 11, further comprising:

after the identifying of whether the driver inputs the P stage, when engagement of the electronic parking brake is not completed, identifying whether the target transmission gear is changed to the P stage;

identifying whether the target transmission gear is not changed to the P stage and a preset second time is exceeded; and controlling the braking force of the main brake to be released when the target transmission gear is not changed to the P stage and the duration of the braking control for maintaining the braking force applied by the main brake exceeds the preset second time.

14. The parking assistance method of claim 13, further comprising controlling the braking force applied by the main brake to be released when the target transmission gear is not changed to the P stage, the duration of the braking control for maintaining the braking force applied by the main brake does not exceed the preset second time, and engagement of the electronic parking brake is completed.

15. The parking assistance method of claim 13, further comprising:

identifying whether transmission to the P stage of the transmission gear is completed when the target transmission gear is changed to the P stage; and controlling the braking force applied by the main brake to be released when the transmission to the P stage of the transmission gear is completed.

16. The parking assistance method of claim 15, further comprising controlling the braking force applied by the main brake to be released when the transmission to the P stage of the transmission gear is not completed and the duration of the braking control for maintaining the braking force applied by the main brake exceeds the preset first time.

17. The parking assistance method of claim 13, wherein the preset first time is longer than the preset second time.

18. The parking assistance method of claim 11, wherein, the identifying of whether the vehicle is braking and stopping comprises identifying whether the vehicle is braking and stopping based on a signal associated with displacement of a brake pedal or a signal associated with a wheel speed.

19. The parking assistance method of claim 11, further comprises identifying whether the vehicle is on an inclined road based on a signal associated with a longitudinal acceleration.

20. The parking assistance method of claim 11, further comprising, when the vehicle is on an inclined road, adjusting the braking force applied the main brake based on an inclination angle of a road surface on which the vehicle is.

* * * * *